United States Patent
Chen et al.

(10) Patent No.: US 6,625,117 B1
(45) Date of Patent: Sep. 23, 2003

(54) METHOD AND APPARATUS FOR SWITCHING MESSAGES FROM A PRIMARY MESSAGE CHANNEL TO A SECONDARY MESSAGE CHANNEL IN A MESSAGE QUEUING SYSTEM

(75) Inventors: Shawfu Chen, New Milford, CT (US); Robert O. Dryfoos, Poughkeepsie, NY (US); Allan Feldman, Poughkeepsie, NY (US); David Y. Hu, Poughkeepsie, NY (US); Peter A. Lewis, Jacksonville, FL (US); Masashi E. Miyake, Poughkeepsie, NY (US); Wei-Yi Xiao, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,139

(22) Filed: Sep. 30, 1999

(51) Int. Cl.$^7$ ............................................. G01R 31/08
(52) U.S. Cl. ...................................... 370/227; 370/462
(58) Field of Search ............................... 370/216, 217, 370/225, 227, 229, 242, 433, 431, 462, 228, 412, 413, 222

(56) References Cited

U.S. PATENT DOCUMENTS

| | | | | |
|---|---|---|---|---|
| 3,569,632 A | * | 3/1971 | Beresin et al. ................. | 179/15 |
| 4,012,597 A | | 3/1977 | Lynk, Jr. et al. | |
| RE32,789 E | | 11/1988 | Lynk, Jr. et al. | |
| 5,048,013 A | * | 9/1991 | Eng et al. ...................... | 370/79 |
| 5,619,647 A | | 4/1997 | Jardine | |
| 5,623,603 A | | 4/1997 | Jiang et al. | |
| 5,710,770 A | | 1/1998 | Kozaki et al. | |
| 5,732,087 A | * | 3/1998 | Lauer et al. ................. | 370/416 |
| 5,799,014 A | | 8/1998 | Kozaki et al. | |
| 5,844,890 A | | 12/1998 | Delp et al. | |
| 5,894,481 A | | 4/1999 | Book | |

FOREIGN PATENT DOCUMENTS

DE PCT WO 97/385 10/1997

OTHER PUBLICATIONS

White Pages Article by Allan Feldman entitled About TPF MQSeries Support, p. 1–7.
IBM Publication entitled "Transaction Processing Facility C/C ++ Language Support User's Guide Version 4, Release 1", Document No. SH31–0121–03 (Jun. 1999).
IBM Publication entitled "MQSeries Command Reference", Document No. SC33–1369–09 (Feb. 1998).
IBM Publication entitled "MQSeries Application Programming Guide", Document No. SC33–0807–09 (Jan. 1999).

* cited by examiner

Primary Examiner—Wellington Chin
Assistant Examiner—Brenda Pham
(74) Attorney, Agent, or Firm—William A. Kinnaman, Jr.

(57) ABSTRACT

A method and apparatus for switching messages from a primary message channel to a secondary message channel in a message queuing system in which messages are placed in a first transmission queue of a local system for transmission to a remote system via a primary message channel. A local queue manager continuously checks to see whether a high water mark has been reached in the first transmission queue, indicating an apparent failure in the primary message channel. On determining such an apparent failure in the primary message channel, the queue manager determines whether the secondary message channel is associated with the first transmission queue. If so, the queue manager activates the secondary message channel to serve said first transmission queue. If, on the other hand, the secondary message channel is associated with another transmission queue, the queue manager transfers messages already in the first queue to the other queue and redirects any new messages intended for the first queue to the other queue. If the other transmission queue was previously empty, the secondary message channel is activated by a trigger to serve the other queue.

24 Claims, 5 Drawing Sheets

METHOD AND APPARATUS FOR SWITCHING MESSAGES FROM A PRIMARY MESSAGE CHANNEL TO A SECONDARY MESSAGE CHANNEL IN A MESSAGE QUEUING SYSTEM

BACKGROUND OF THE INVENTION

1. Field of the Invention

This invention relates to a method and apparatus for switching messages from a primary message channel to a secondary message channel in a message queuing system when the primary message channel is out of service.

2. Description of the Related Art

Message queuing is a common form of interprocess communication (IPC) in information handling systems. In its basic form, a first process (typically a user application) places a message on a defined queue by issuing a defined command (such as MQPUT in an IBM MQSeries message queuing environment), while a second process retrieves the message from the queue by issuing another defined command (such as MQGET in the same MQSeries environment).

Message queues may be either local queues on a local system or remote queues on a remote system. When a local application sends a message to a remote queue in an MQSeries environment, the local queue manager receiving the MQPUT command puts the message on a specially defined local queue called a transmission queue. A sender channel on the local system forwards any messages in the transmission queue via a network to a receiver channel on the remote system. (The sender and receiver channels are generically referred to herein as message channels.) The receiver channel in turn forwards the messages to the remote queue that was the intended recipient. MQSeries message channels are conventionally implemented using standard network protocols such as TCP/IP or SNA LU 6.2. Communication networks, however, are notoriously susceptible to failures and outages, which in turn may cause an MQSeries message channel to become unavailable to a local system. When that happens, messages on the local system which are destined for other systems using the unavailable message channel for transport can no longer be sent. This presents a serious problem for a high-performance transaction processor, because the messages on the local system use system resources which cannot be released until the messages are sent. Human intervention is typically required to handle this problem by trying to resolve the network problem.

Very often a network problem is not easily resolvable, and a message channel outage can eventually cause a message queuing system to become unavailable, due to the resource tieup. Thus, system availability and reliability are greatly reduced, and human intervention is required to remediate the situation.

SUMMARY OF THE INVENTION

In general, the present invention relates to a method and apparatus for switching messages from a primary message channel to a secondary message channel in a message queuing system in which messages are placed in a first transmission queue of a local system for transmission to a remote system via the primary message channel. In accordance with the invention, a determination is made of whether there has been an apparent failure in the primary message channel. Such determination is preferably made by determining that a high water mark has been reached in the first transmission queue.

In response to determining such an apparent failure in the primary message channel, a determination is made of whether the secondary message channel is associated with the first transmission queue. If the secondary message channel is associated with the first transmission queue, then the secondary message channel is activated to serve the first transmission queue. If, on the other hand, the secondary message channel is associated instead with a second transmission queue, the messages already in the first queue are transferred to the second queue and any new messages intended for the first queue are redirected to the second queue.

The present invention allows messages to be switched non-disruptively from a failing first message channel to a second message channel without requiring operator invention.

DESCRIPTION OF THE PREFERRED EMBODIMENT

Figure 1:
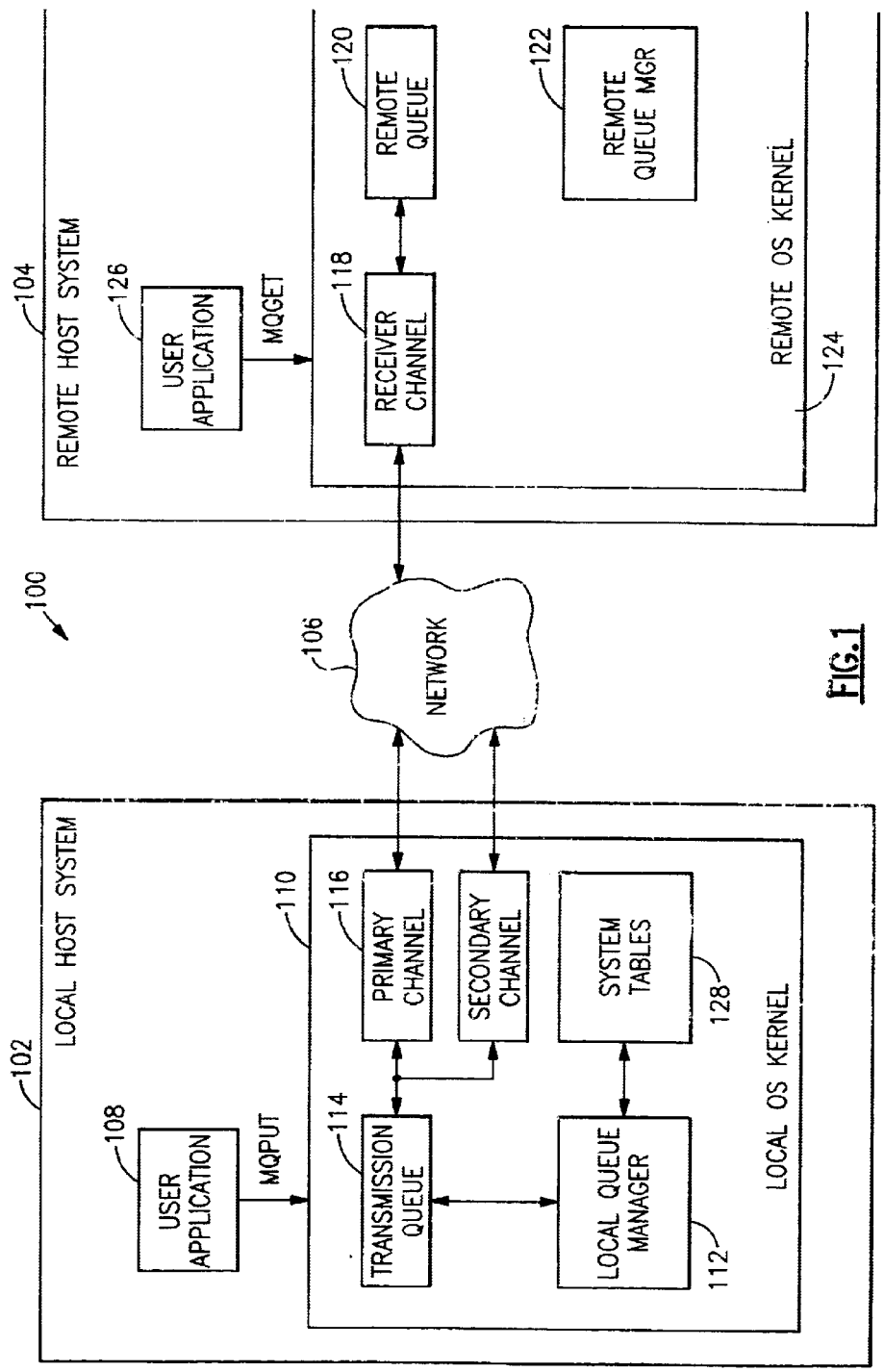
FIG. 1 shows an information handling system 100 incorporating the present invention.

FIG. 1 shows an information handling system 100 incorporating the present invention. System 100 comprises a local host system 102 coupled to a remote host system 104 via a network 106. (The terms "local" and "remote" are with reference to system 102, the system of primary interest here. From the standpoint of system 104, system 102 would be the "remote" system.) Resident on local host system 102 are at least one user application 108 and a local operating system (OS) kernel 110. Local OS kernel 110 manages the resources on local host system 102 and provides various services to resident user applications 108, including the message queuing services described herein. Although the present invention is not limited to any particular platform, in a preferred implementation the local host system 102 is an IBM S/390 Parallel Enterprise Server processor, while OS kernel 110 is the IBM Transaction Processing Facility (TPF) with its MQSeries message queuing services, as described, for example, in the white paper by Allan Feldman entitled "About TPF MQSeries Support", available online at http://www.s390.ibm.com/products/tpf/mqwhite.htm and incorporated herein by reference. MQSeries as implemented on TPF or generally is further described on the IBM Internet site at http://www.software.ibm.comlts/mqseries/, incorporated herein by reference, as well as in the following IBM publications, also incorporated herein by reference:

MQSeries® Application Programming Guide, Document Number SC33-0807-09 (January 1999);

Transaction Processing Facility C/C++ Language Support User's Guide Version 4 Release 1, Document Number SH31-0121-03 (June 1999);

MQSeries Command Reference, Document Number SC33-1369-09 (February 1998).

Local OS kernel 110 contains a local queue manager 112 that, in the preferred embodiment, supports three different queue types: local, remote and alias. Local queues are either normal queues (not shown) or transmission queues 114. Normal queues physically reside on the local system 102. Local applications 108 use the MQSeries application programming interface (API) command MQPUT to put messages onto local queues for processing by other local applications, which retrieve the messages from the local queues using the API command MQGET.

Transmission queues 114, on the other hand, contain messages that are destined for a remote system 104 and are the subject of the present invention. Each transmission queue 114 has its output coupled to a primary message channel, specifically, a sender channel 116, which is coupled via network 106 to a receiver channel 118 in remote host system 104. Receiver channel 118 is in turn coupled to a remote queue 120. In a manner similar to that of the transmission queue 114 on local host system 102, remote queue 120 is managed by a remote queue manager 124 in a remote OS kernel 124 of remote host system 104. Remote system 104 may be another TPF MQSeries system, like local system 102, or may be some other platform, such as AIX or Windows NT, that suppors the MQSeries protocols.

Like normal queues, transmission queues 114 are physically located on the local system 102. Local applications 108 do not normally put messages directly on or get messages directly from transmission queues 114. Rather, when a local application 108 puts a message onto a remote queue 120 (using MQPUT), the local queue manager 112 determines which transmission queue 114 to put the message on. The primary message channel 116 associated with transmission queue 114 takes the messages from that queue and sends them (via network 106 and receiver channel 118) to the remote queue 120. Finally, a user application 126 on remote host system 104 may retrieve messages from the queue 120 using the MQSeries command MQGET.

Alias queues are defined by a system administrator. When an alias queue is opened by an application, the queue that is actually opened is some other target of the alias queue, either a local queue or a local definition of a remote queue. In this way, the system administrator may manage the queues that are processed by applications in a manner that is transparent to the applications. The application code never has to change to satisfy changes in queue names.

In addition to having a primary message channel 116, each transmission queue 114 on the local system may also have a defined secondary message channel 128. Secondary message channel 128 is used to handle the transmission of messages from transmission queue 114 if the primary message channel 116 should become unavailable, as described below.

The foregoing describes message communications from the local host system 102 to the remote host system 104. Although not shown in FIG. 1, remote host system 104 would typically have similar transmission queues and sender channels, and local system 102 would have similar receiver channels, for message communications in the other direction.

Figure 4:
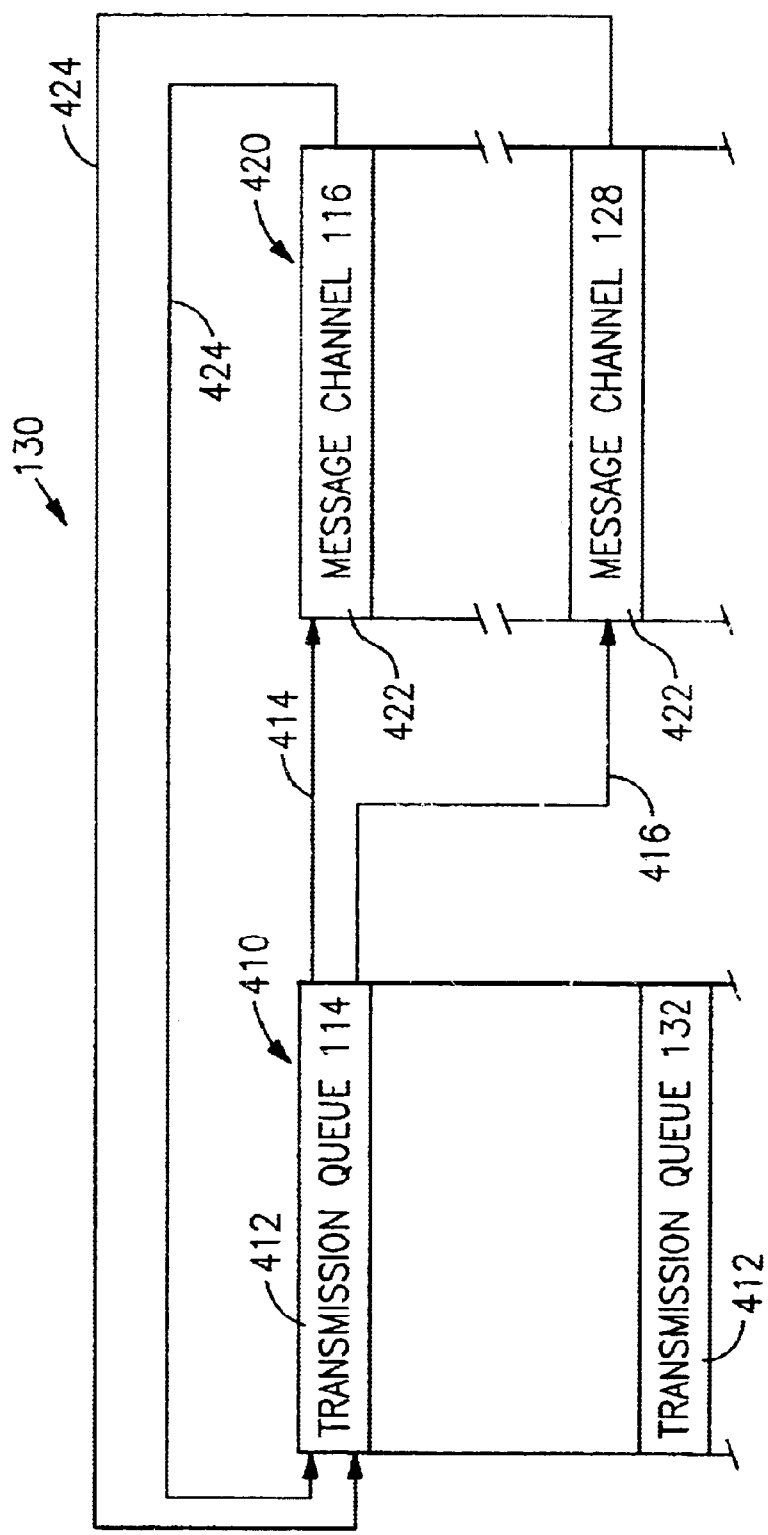
FIG. 4 shows the system tables of the local queue manager in a scenario in which the secondary message channel is associated with the original message queue.
Figure 5:
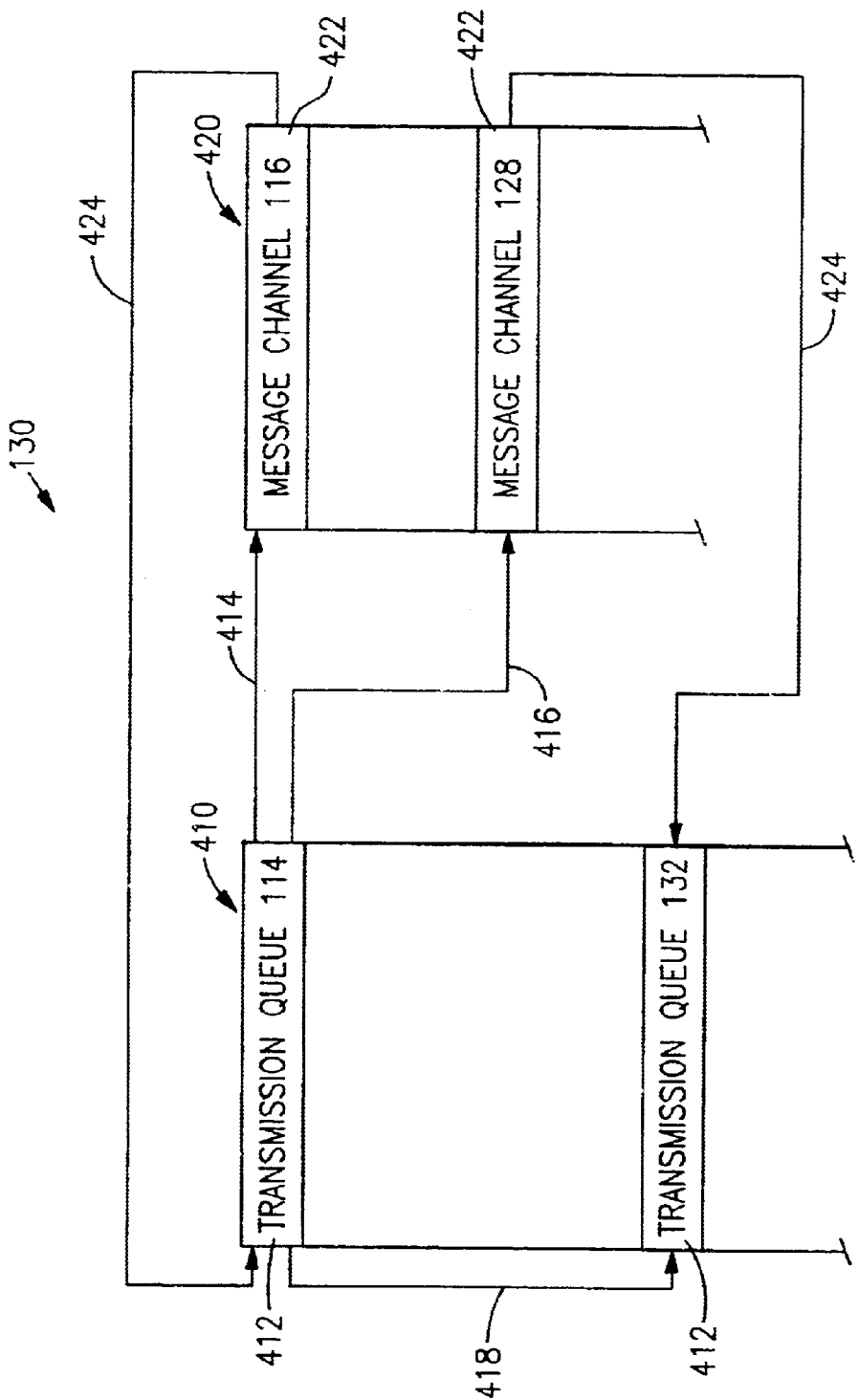
FIG. 5 shows the system tables of the local queue manager in a scenario in which the secondary message channel is associated with a different message queue.

Local queue manager 112 uses a set of system tables 130 to manage the various transmission queues 114 and message channels 116 and 128. Thus, referring now to FIGS. 4 and 5, these tables include a transmission queue table 410 and a message channel table 420. Transmission queue table 410 contains an entry 412 for each local transmission queue 114 while, similarly, message channel table 420 contains an entry 422 for each local message channel 116 or 128. Each entry 412 in queue table 410 in turn contains a pointer 414 to the entry 422 in channel table 420 for the corresponding primary message channel 116, as well as a pointer 416 to the entry 422 (if any) in channel table 420 for the corresponding secondary message channel 128 and a flag (not shown) indicating which of the primary or secondary message channels is currently being used to transport messages. In addition, as shown in FIG. 5, each entry 412 in queue table 410 may contain a pointer 418 to the entry 412 for another transmission queue (referred to herein as the swing queue) to which messages for the original transmission queue 114 are redirected in accordance with the present invention.

In a similar manner, each entry 422 in channel table 420 corresponding to a message channel 116 or 128 contains a pointer 424 to the message queue 114 for which the corresponding channel is a primary or secondary message channel.

Figure 2:
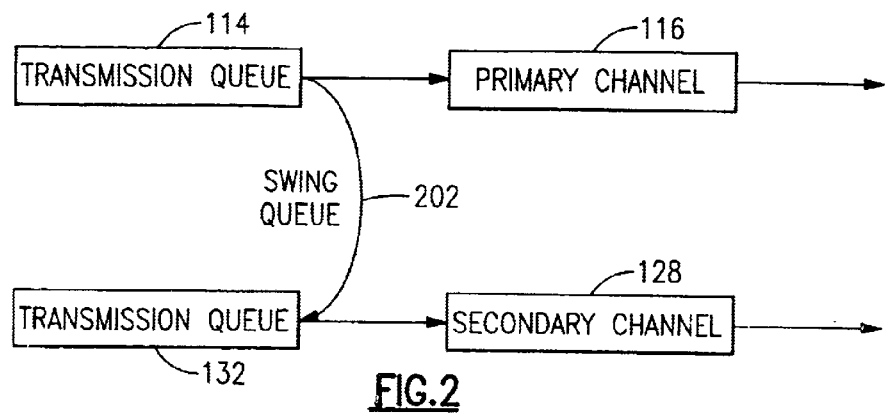
FIG. 2 shows the redirection of messages from a first transmission queue to a second transmission queue.

Note that the associations between transmission queues and message channels are not necessarily commutative. Thus, in the scenario depicted in FIG. 4, transmission queue 114 is associated with message channel 116 as a primary channel as indicated by pointer 414 and with message channel 128 as a secondary channel as indicated by pointer 416. Conversely, each of the two message channels 116 and 128 is associated with transmission queue 114 as indicated by their respective pointers 424. In the scenario depicted in FIG. 5, on the other hand, transmission queue 114 is still associated with message channels 116 and 128 as indicated by pointers 414 and 416. However, in this scenario only the first message channel 116 is associated with transmission queue 114 as indicated by its pointer 424, whereas the second message channel 128 is associated with a different transmission queue 132 (FIG. 2). Thus, even though the first transmission queue 114 looks to message channel 128 as a secondary channel, that channel cannot be dissociated from the other transmission queue 132 without leaving that queue unserved. Instead, in accordance with the present invention, messages in the original queue 114 are redirected to the other queue 132, as described below.

Figure 3A:
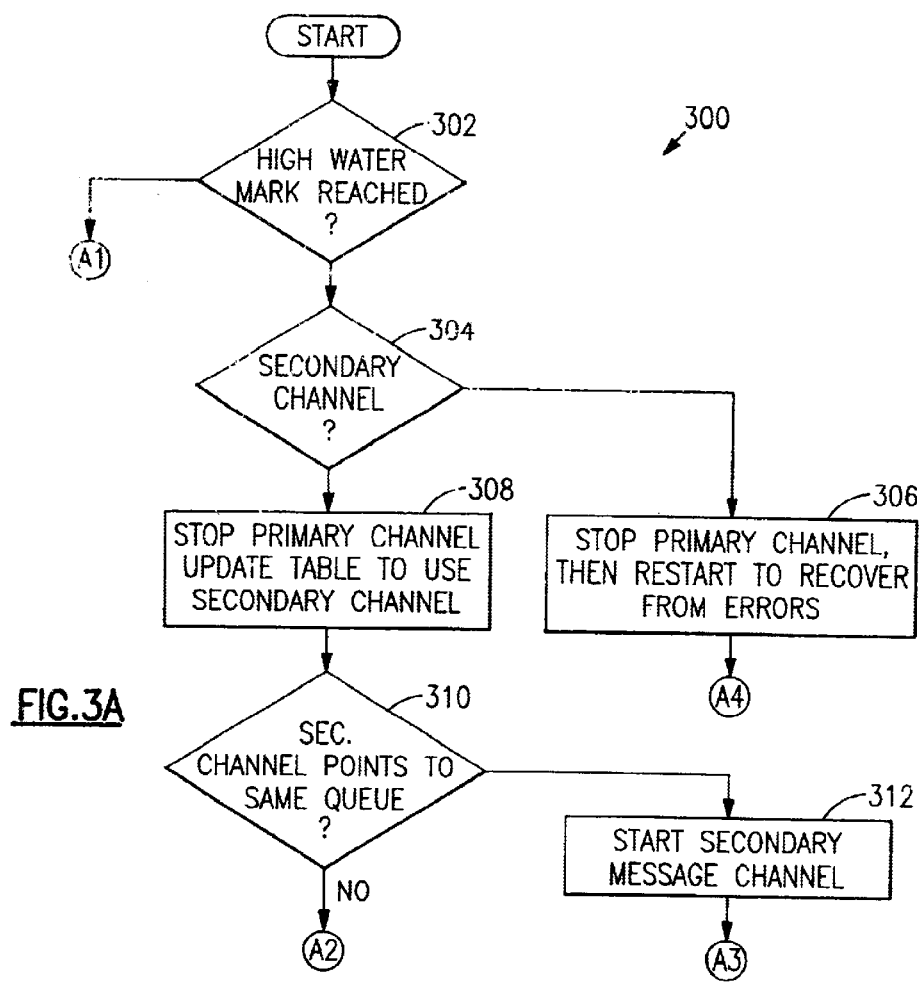
FIGS. 3A and 3B show the routine for switching messages to a secondary message channel in accordance with the present invention.
Figure 3B:
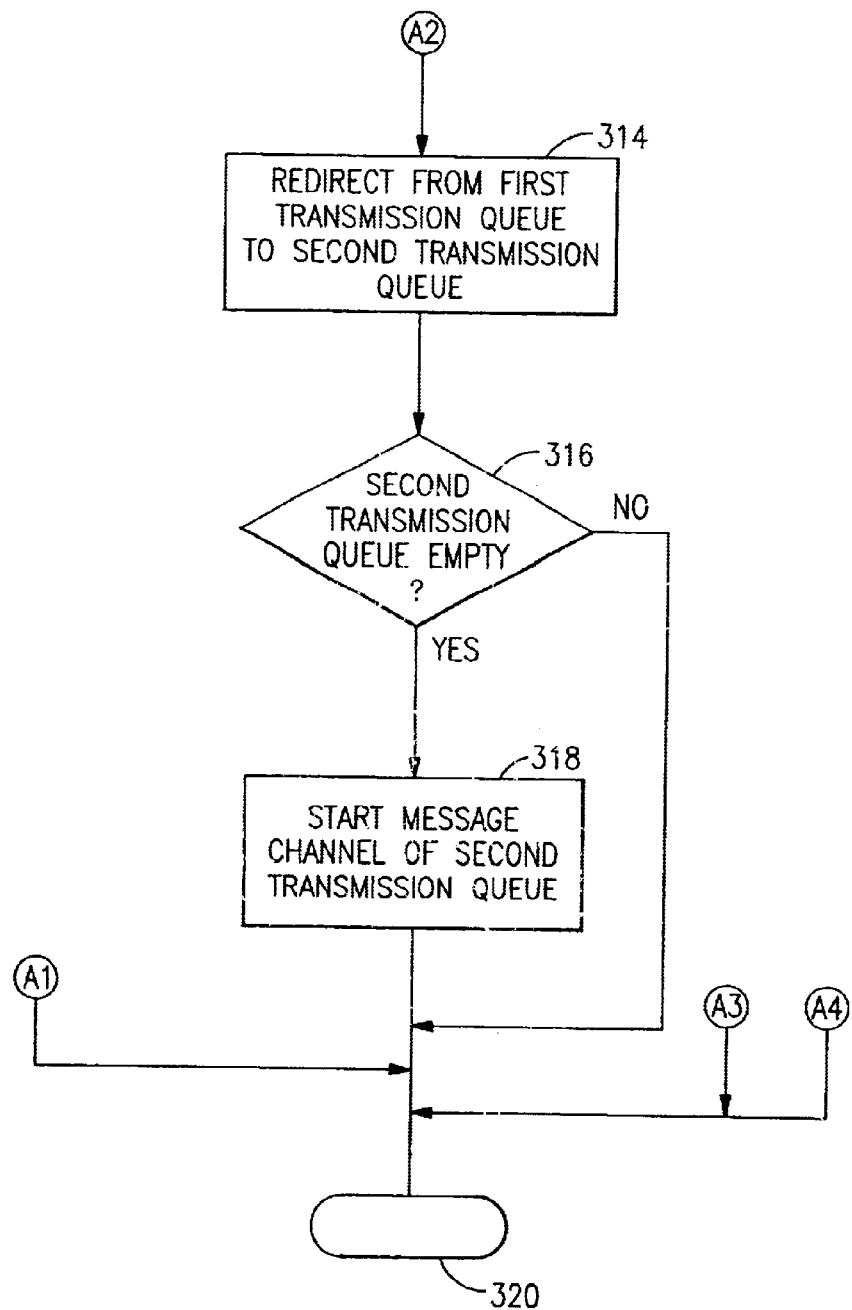

FIGS. 3A-3B show the routine 300 for switching messages to a secondary message channel in accordance with the present invention. The routine 300 is iteratively performed by the local queue manager 112 for each transmission queue 114 on the local host system 102.

The routine 300 starts by determining whether a high water mark has been reached in transmission queue 114 (step 302). This is done by determining either the number of messages in the queue 114 or the number of bytes consumed by the messages in the queue, using any one of a number of techniques well known in the art. The high water mark may be set by the user or system administrator based on the expected traffic on the channel 116. Such a high water mark would be an indication that buildup has occurred in the transmission queue 114 as the result of an inactive primary message channel. If the high water mark has not been reached, the routine 300 terminates (step 320), after which it repeats beginning at step 302.

If at step 302 the high water mark has been reached, the routine 300 determines the identity of the secondary message channel 128 (if any) from the system tables 130 where the transmission queues are defined (step 304). More particularly, the routine checks the secondary channel pointer 416 of the entry 412 in the queue table 410 for the transmission queue 114 to determine whether it points to an entry 422 in the message channel table 420. If there is no such secondary channel defined, the routine 300 stops the primary channel 116 (using the MQSeries STOP CHANNEL command) then restarts the primary channel (using the MQSeries START CHANNEL command) to permit the primary channel to recover (step 306), before terminating (step 320).

If at step 304 it is determined that there is a secondary channel 128 defined for the transmission queue 114, the routine 300 stops the primary channel 116 and updates the system tables 130 (by updating the flag in the queue table 410) to use the secondary channel 128 to transmit messages from the queue 114 (step 308). The routine 300 then determines, by checking the queue pointer 424 in the corresponding channel table entry 422, whether the secondary message channel 128 is associated with the same transmission queue 114 (step 310). If the secondary message channel 128 is associated with the same transmission queue 114, as shown in FIG. 4, the routine performs a start message channel operation (using a START CHANNEL command) to activate the message channel 128 to service the transmission queue 114 (step 312), then terminates (step 320).

If the secondary message channel 128 is associated with a different transmission queue 132, as shown in FIGS. 2 and 5, a swing queue operation is performed to move messages in the original transmission queue 114 to the new transmission queue 132 (step 314). This operation has two parts. First, all messages already in the original transmission queue 114 are transferred to the new transmission queue 132, from which they are ultimately removed by the secondary message channel 128. Second, any new messages from an application 108 intended for the original transmission queue 114 (en route to a remote queue 120) are redirected to the new transmission queue 132. Queue table 410 is updated to reflect this redirection by creating a pointer 418 from the entry 412 for the original transmission queue 114 to the entry for the new transmission queue 132, as shown in FIG. 5. From that point on, the new transmission queue 132 becomes the originating transmission queue for the remote queues (e.g., queue 120) that used the original transmission queue 114.

If the new transmission queue 132 was empty before the transmission queue swing (step 316), after the queue is swung a trigger mechanism is activated to start the channel 128 automatically to serve the new transmission queue 132 (step 318) before terminating (step 320). Otherwise, the routine 300 terminates without performing the trigger operation (step 320).

The secondary channel 128 stays activated until a command is entered to swing back to the original transmission queue 114 once the original message channel 116 is recovered. This is accomplished by restoring the original settings in the system tables 130.

With the present invention, a transmission queue 114 will be served as long as one of the primary and secondary message channels 116 and 128 is active. This prevents the queue 114 from building up and depleting system resources. The channel switch of the present invention is completely non-disruptive and requires no human intervention.

While a particular embodiment has been shown and described, various modifications will be apparent to those skilled in the art. Thus, as already noted, the invention may be implemented on other platforms as well as in message queuing environments other than the MQSeries environment described herein.

What is claimed is:

1. In a message queuing system in which messages are placed in a first transmission queue of a local system for transmission to a remote system via a primary message channel, a method of switching said messages from said primary message channel to a secondary message channel, comprising the steps of:
  determining an apparent failure in said primary message channel;
  in response to determining said apparent failure in said primary message channel, determining whether said secondary message channel is associated with said first transmission queue;
  if said secondary message channel is associated with said first transmission queue, activating said secondary message channel to serve said first transmission queue; and
  if said secondary message channel is associated with a second transmission queue, redirecting the messages in said first transmission queue to said second transmission queue.

2. The method of claim 1 in which said step of determining an apparent failure in said primary channel comprises the step of:
  determining that a high water mark has been reached in said first transmission queue.

3. The method of claim 1, comprising the further steps of:
  determining whether said second transmission queue was empty before redirection of the messages from the first queue; and
  if said second transmission queue was empty before said redirection, activating said secondary message channel to serve said second queue.

4. The method of claim 3 in which said step of activating said secondary message channel comprises the step of:
  sending a trigger to said secondary message channel.

5. The method of claim 1, comprising the further step of:
  defining a queue table containing entries for said first and second queues.

6. The method of claim 5 in which said redirecting step comprises the step of:
  creating a pointer from the entry for said first queue to the entry for said second queue.

7. The method of claim 1 in which said redirecting step comprises the step of:
  transferring any existing messages in said first transmission queue to said second transmission queue.

8. The method of claim 1 in which said redirecting step comprises the step of:
  redirecting any new messages intended for said first transmission queue to said second transmission queue.

9. In a message queuing system in which messages are placed in a first transmission queue of a local system for transmission to a remote system via a primary message channel, apparatus for switching said messages from said primary message channel to a secondary message channel, comprising:
  means for determining an apparent failure in said primary message channel;
  means responsive to a determination of an apparent failure in said primary message channel for determining whether said secondary message channel is associated with said first transmission queue or a second transmission queue;
  means for activating said secondary message channel to serve said first transmission queue if said secondary message channel is associated with said first transmission queue; and means for redirecting the messages in said first transmission queue to said second transmission queue if said secondary message channel is associated with said second transmission queue.

10. The apparatus of claim 9 in which said means for determining an apparent failure in said primary channel comprises:

means for determining that a high water mark has been reached in said first transmission queue.

11. The apparatus of claim 9, further comprising:

means for determining whether said second transmission queue was empty before redirection of the messages from the first queue; and means for activating said secondary message channel to serve said second queue if said second transmission queue was empty before said redirection.

12. The apparatus of claim 11 in which said means for activating said secondary message channel comprises:

means for sending a trigger to said secondary message channel.

13. The apparatus of claim 9 further comprising:

means for defining a queue table containing entries for said first and second queues.

14. The apparatus of claim 13 in which said redirecting means comprises:

means for creating a pointer from the entry for said first queue to the entry for said second queue.

15. The apparatus of claim 9 in which said redirecting means comprises:

means for transferring any existing messages in said first transmission queue to said second transmission queue.

16. The apparatus of claim 9 in which said redirecting means comprises:

means for redirecting any new messages intended for said first transmission queue to said second transmission queue.

17. A program storage device readable by a machine, tangibly embodying a program of instructions executable by the machine to perform method steps for switching messages from a primary message channel to a secondary message channel in a message queuing system in which messages are placed in a first transmission queue of a local system for transmission to a remote system via said primary message channel, said method steps comprising:

determining an apparent failure in said primary message channel;

in response to determining said apparent failure in said primary message channel, determining whether said secondary message channel is associated with said first transmission queue;

if said secondary message channel is associated with said first transmission queue, activating said secondary message channel to serve said first transmission queue; and if said secondary message channel is associated with a second transmission queue, redirecting the messages in said first transmission queue to said second transmission queue.

18. The program storage device of claim 17 in which said step of determining an apparent failure in said primary channel comprises:

determining that a high water mark has been reached in said first transmission queue.

19. The program storage device of claim 17, said method steps further comprising:

determining whether said second transmission queue was empty before redirection of the messages from the first queue; and if said second transmission queue was empty before said redirection, activating said secondary message channel to serve said second queue.

20. The program storage device of claim 19 in which said step of activating said secondary message channel comprises:

sending a trigger to said secondary message channel.

21. The program storage device of claim 17, said method steps further comprising:

defining a queue table containing entries for said first and second queues.

22. The program storage device of claim 21 in which said redirecting step comprises:

creating a pointer from the entry for said first queue to the entry for said second queue.

23. The program storage device of claim 17 in which said redirecting step comprises transferring any existing messages in said first transmission queue to said second transmission queue.

24. The program storage device of claim 17 in which said redirecting step comprises:

redirecting any new messages intended for said first transmission queue to said second transmission queue.

* * * * *